(12) United States Patent
DiStasio et al.

(10) Patent No.: US 9,038,456 B2
(45) Date of Patent: May 26, 2015

(54) GRAVITY GRADIOMETER

(75) Inventors: Marcello M. DiStasio, Syracuse, NY (US); Ion V. Nicolaescu, Carpentersville, IL (US)

(73) Assignee: SRC, Inc., North Syracuse, NY (US)

( * ) Notice: Subject to any disclaimer, the term of this patent is extended or adjusted under 35 U.S.C. 154(b) by 303 days.

(21) Appl. No.: 13/539,988

(22) Filed: Jul. 2, 2012

(65) Prior Publication Data

US 2014/0000362 A1   Jan. 2, 2014

(51) Int. Cl.

| | |
|---|---|
| *G01V 7/08* | (2006.01) |
| *G01V 7/16* | (2006.01) |
| *G01C 19/00* | (2013.01) |
| *G01V 7/00* | (2006.01) |

(52) U.S. Cl.
CPC ... *G01V 7/00* (2013.01); *G01V 7/16* (2013.01)

(58) Field of Classification Search
CPC ............ G01V 7/00; G01V 7/005; G01V 7/08
USPC .......... 73/382 R, 383, 382 G, 514.01–514.02, 73/504.12, 504.02–504.04
See application file for complete search history.

(56) References Cited

U.S. PATENT DOCUMENTS

| | | | |
|---|---|---|---|
| 4,699,006 A | 10/1987 | Boxenhorn | |
| 4,841,772 A | 6/1989 | Paik | |
| 5,224,380 A | 7/1993 | Paik | |
| 5,505,555 A | 4/1996 | Van Kann et al. | |
| 5,922,950 A | 7/1999 | Pemberton et al. | |
| 6,349,597 B1 * | 2/2002 | Folkmer et al. | 73/504.02 |
| 7,305,879 B2 | 12/2007 | Moody et al. | |
| 7,360,419 B2 | 4/2008 | French et al. | |
| 7,594,438 B2 | 9/2009 | Ackerley et al. | |
| 7,814,790 B2 | 10/2010 | Van Kann | |
| 8,616,057 B1 * | 12/2013 | Mao | 73/504.14 |
| 2009/0044621 A1 * | 2/2009 | Brett et al. | 73/382 R |
| 2009/0223276 A1 * | 9/2009 | Rudolf et al. | 73/1.37 |
| 2009/0255339 A1 | 10/2009 | McNeil et al. | |

(Continued)

FOREIGN PATENT DOCUMENTS

| | | |
|---|---|---|
| FR | 2945621 A1 * | 11/2010 |
| KR | 101113011 | 2/2012 |

(Continued)

OTHER PUBLICATIONS

International Search Report Form PCT/ISA/210, International Application No. PCT/US2013/028984, pp. 1-10, dated Jun. 14, 2013.
Young, et al. "Development of a High Temperature Superconducting Magnetic Tensor Gradiometer for Underwater UXO Detection," IEEE Oceans, May 2010. http://ieexplore.ieee.org/xpls/abs_all.jsp?arnumber=5603585 &tag=1.

*Primary Examiner* — Eric S McCall
*Assistant Examiner* — Anthony W Megna Fuentes
(74) *Attorney, Agent, or Firm* — George R. McGuire; Bond Schoeneck & King, PLLC

(57) ABSTRACT

A gravity gradiometer having at least three differential accelerometers with a low response to linear accelerations and at least six angular accelerometers that give it the capability of measuring angular rates by integrating the angular accelerations. Both types of accelerometers are based on a compliant mechanism with very low and adjustable stiffness that is achieved by using flexures under compressive load that contribute a negative stiffness to the total elastic response of the mechanism. Both types of accelerometers are operated in a servo-compensation feedback mode so that at no time is the mechanism far from its equilibrium position.

13 Claims, 14 Drawing Sheets

(56) References Cited

U.S. PATENT DOCUMENTS

| | | |
|---|---|---|
| 2010/0064767 A1 | 3/2010 | Rice et al. |
| 2010/0071461 A1 | 3/2010 | Beverini et al. |
| 2010/0101321 A1 | 4/2010 | Moody |
| 2010/0101322 A1 | 4/2010 | French |
| 2011/0154898 A1* | 6/2011 | Cazzaniga et al. ......... 73/504.12 |
| 2012/0222481 A1 | 9/2012 | French et al. |

FOREIGN PATENT DOCUMENTS

| | | |
|---|---|---|
| WO | WO2010061183 | 6/2010 |
| WO | WO2010096020 | 8/2010 |

* cited by examiner

GRAVITY GRADIOMETER

BACKGROUND OF THE INVENTION

1. Field of the Invention

The present invention relates to gravity gradiometry and, more particularly, to quadrupole gravity gradiometers.

2. Description of the Related Art

Measuring the gravitational field involves quantifying the gravitational forces acting on test masses. Gravimeter instruments measure the acceleration of gravity and are sensitive to linear accelerations. Doing measurements with an instrument carried by a non-inertial moving platform requires evaluating the inertial forces acting on test masses and subtracting their effect from the measured signal. Also, platform induced forces are many orders of magnitude higher than the variations of acceleration of gravity measured and an appropriate suspension is required on order to reduce such forces to a level that can be handled by the dynamic range of the instrument. For that reason gravity gradiometer instruments are more useful, since they have low sensitivity to linear acceleration by their operating principle.

The gravity potential generated by mass m at distance r is $$\Phi = G\frac{m}{r}$$

where $G = 6.674 \times 10^{-11}$ m$^3$ kg$^{-1}$ s$^{-2}$ is the Newtonian constant of gravitation. The acceleration of gravity in that potential field is $$g = (g_x, g_y, g_z)^T = \left(\frac{d\Phi}{dx}, \frac{d\Phi}{dy}, \frac{d\Phi}{dz}\right)^T.$$

The tensor of the gravity acceleration gradient is $$\Gamma = \begin{pmatrix} \Gamma_{xx} & \Gamma_{xy} & \Gamma_{xz} \\ \Gamma_{yx} & \Gamma_{yy} & \Gamma_{yz} \\ \Gamma_{zx} & \Gamma_{zy} & \Gamma_{zz} \end{pmatrix} = \begin{pmatrix} \frac{dg_x}{dx} & \frac{dg_x}{dy} & \frac{dg_x}{dz} \\ \frac{dg_y}{dx} & \frac{dg_y}{dy} & \frac{dg_y}{dz} \\ \frac{dg_z}{dx} & \frac{dg_z}{dy} & \frac{dg_z}{dz} \end{pmatrix} = \begin{pmatrix} \frac{d^2\Phi}{dx^2} & \frac{d^2\Phi}{dxdy} & \frac{d^2\Phi}{dxdz} \\ \frac{d^2\Phi}{dydx} & \frac{d^2\Phi}{dy^2} & \frac{d^2\Phi}{dydz} \\ \frac{d^2\Phi}{dzdx} & \frac{d^2\Phi}{dzdy} & \frac{d^2\Phi}{dz^2} \end{pmatrix}.$$

Obviously, the order of differentiation is irrelevant, therefore the tensor is symmetric. It also has zero trace (the sum of diagonal elements is zero) since gravity obeys Laplace's equation in free space. Therefore only five components of the tensor are independent.

The gravity acceleration gradient is measured in Eötvös units (E) defined as $1\ E = 10^{-9}$ s$^{-1}$. Current commercial gradiometers have a sensitivity of a few Eötvös units.

BRIEF SUMMARY OF THE INVENTION

In view of the above, it is an object of the present invention to provide a gravity gradiometer instrument for full gradient tensor measurement, suitable for operation from a moving platform such as an airplane. The instrument according to the present invention has inherent low sensitivity to linear accelerations and is capable of measuring and compensating the centrifugal forces resulting from the non-inertial movement of the platform carrying it.

A gravity gradiometer according to the present invention consists of at least three differential accelerometers that, by their symmetric construction, have low response to linear accelerations. As any gravity gradiometer has inherent sensitivity to centrifugal forces due to non-inertial movement of the carrier platform, the present invention further comprises mounting the gradiometer in a suspension system able to isolate rotations. However, no isolation system is perfect and some rotations are sensed by the instrument causing noise and reducing its sensitivity. The gravity gradiometer according to the present invention also includes at least six angular accelerometers that give it the capability of measuring angular rates by integrating the angular accelerations. Both types of accelerometers are based on a compliant mechanism with very low and adjustable stiffness. This is achieved by using flexures under compressive load that contribute a negative stiffness to the total elastic response of the mechanism. The compliant mechanism is machined out of a single plate of metal by milling and electro-discharge machining. Compared to other construction methods this eliminates uncontrollable friction forces and vibrations, reduces the weight, and eliminates assembly tolerances. Both types of accelerometers are operated in a servo-compensation feedback mode so that at no time is the mechanism far from its equilibrium position. This arrangement ensures linear response over a very large range of forces.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
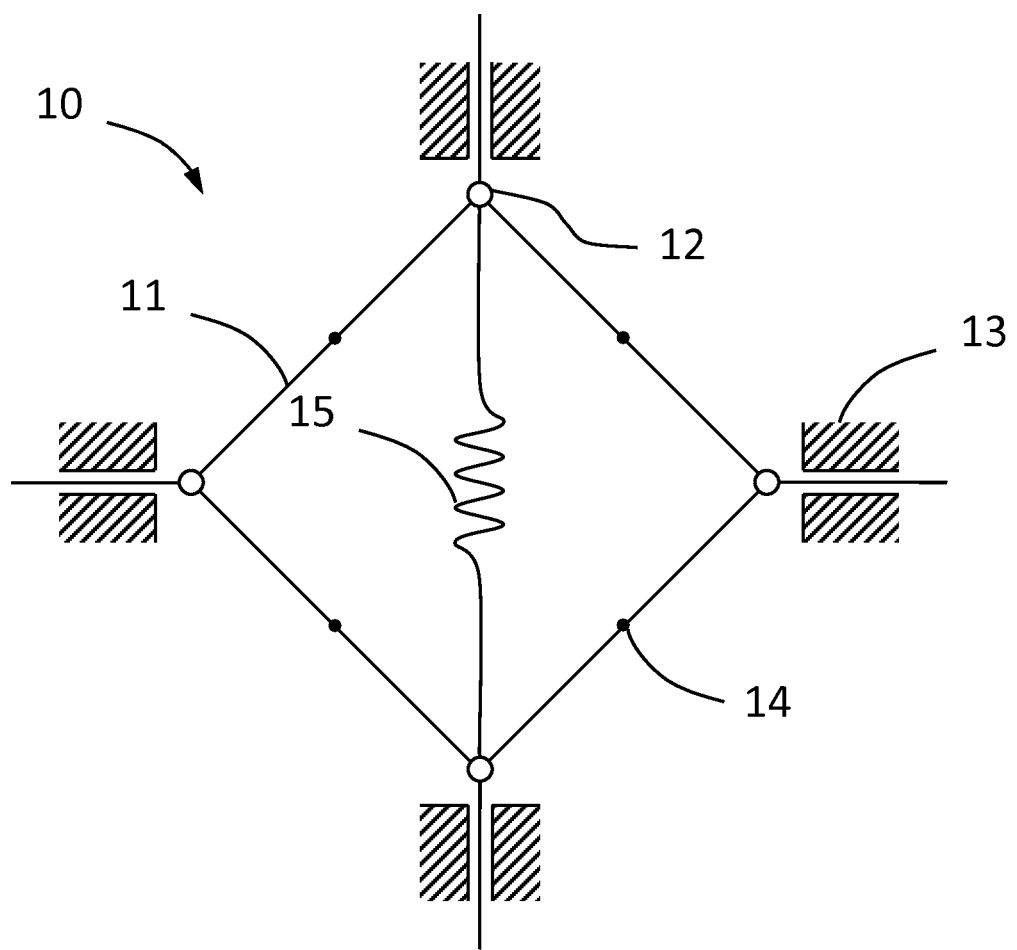
FIG. 1 is a kinematic diagram of a differential accelerometer mechanism according to the present invention.

Referring now to the drawings, wherein like numbers refer to like parts throughout, there is seen in FIG. 1 a differential accelerometer mechanism 10 according to the present that is constrained to move in the plane of the figure. Mechanism 10 includes a linkage comprising four rigid beams 11 of equal length, articulated at a series of nodes 12. Nodes 12 are constrained to move perpendicularly to the symmetry axes of mechanism 10. The constraint is achieved by suspensions, symbolically represented by a series of guides 13, attached to a fixed frame. While nodes 12 execute rectilinear movements, the beam midpoints 14 move along a circle centered at the geometric center of mechanism 10. If an elastic element, such as a spring 15, and a test mass (not shown) are added to mechanism 10, it becomes an accelerometer.

It is obvious that mechanism 10 has one degree of freedom. Therefore any combination of springs, in any positions, can be represented symbolically by spring 15. Spring 15 works both in extension and compression and, if there are no loads present, maintains the mechanism in its equilibrium position, which is a position where the adjacent beams are perpendicular to each other forming a square. By adding two or more test masses, a differential accelerometer may be created. Several configurations that should be obvious to those skilled in the art are possible.

Figure 2:
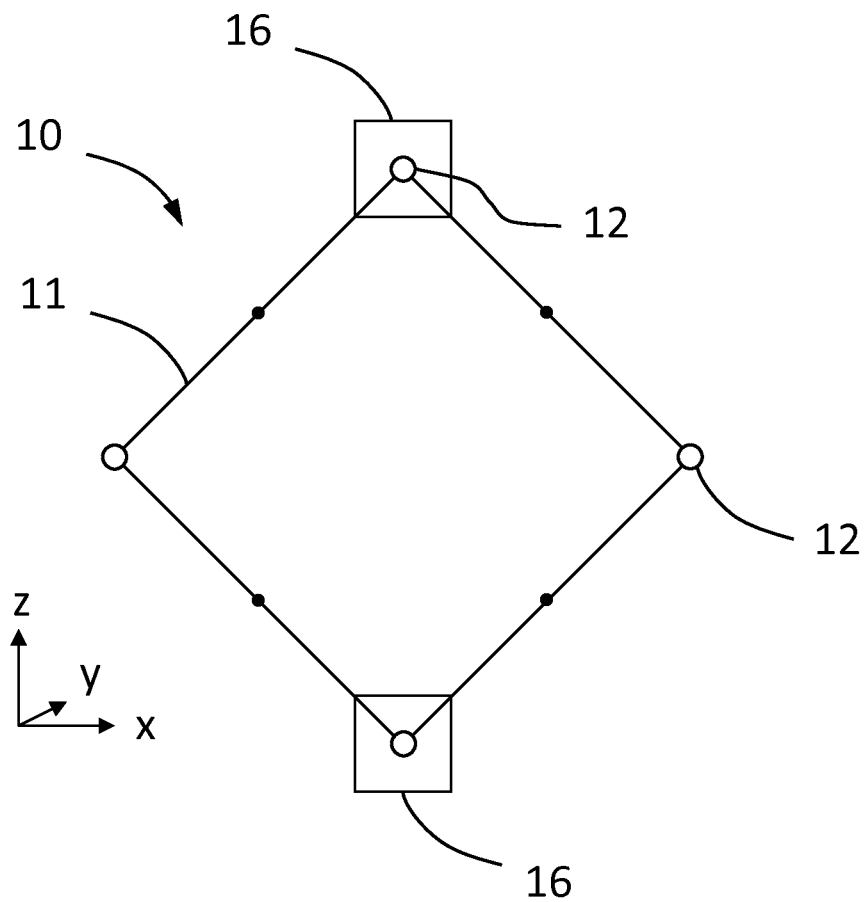
FIG. 2 is a kinematic diagram of a differential accelerometer according to the present invention.

An exemplary embodiment of a differential accelerometer according to the present invention may be seen FIG. 2. Two equal test masses 16 are attached to two of the opposing nodes of mechanism 10 of FIG. 1 where, for clarity, the spring and constraints are not shown. This arrangement forms a differential accelerometer with its sensitive axis passing through the nodes having the test masses 16. A difference in the acceleration of gravity along the sensitivity axis will cause a displacement of the test masses from their equilibrium position. If we take into account centrifugal forces caused by rotations, the accelerometer static response, namely the displacement of the nodes, δl is:

$$\delta l = \frac{ml}{k}(\Gamma_{zz} + \omega_x^2 + \omega_y^2)$$

where m is the test mass, l is the distance between opposing nodes, also called the accelerometer base, k is the elastic constant of the mechanism, and $\omega_x$ and $\omega_y$ are the angular rates of rotations around axes x and y respectively, of a coordinate system attached to the accelerometer frame, relative to an inertial frame, as shown in FIG. 2.

Figure 3:
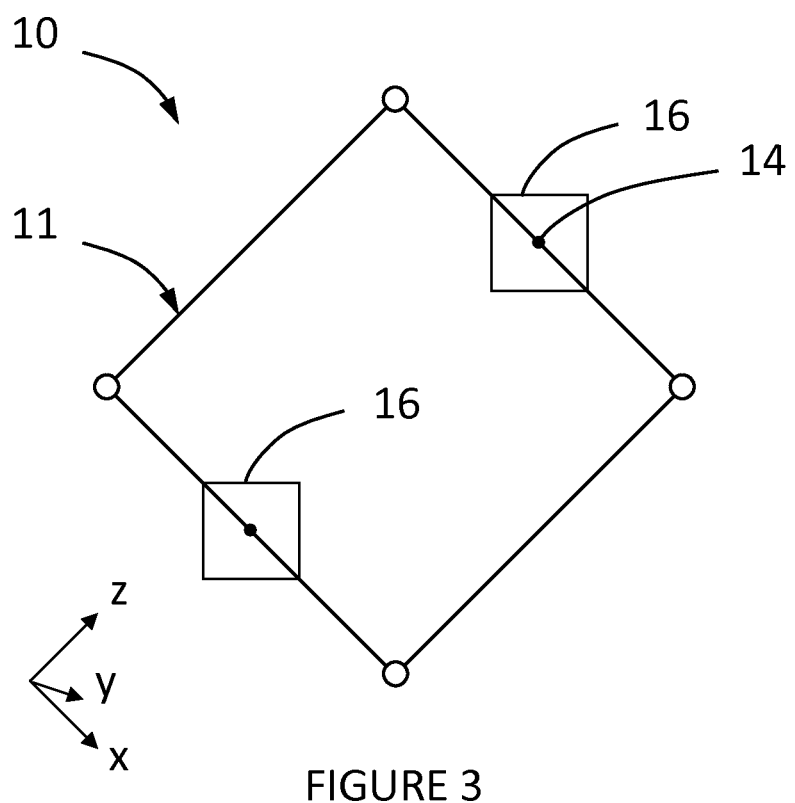
FIG. 3 is a kinematic diagram of an angular accelerometer.

An exemplary embodiment of an angular accelerometer may be seen in FIG. 3, which depicts mechanism 10 of FIG. 1 having two equal masses 16 attached to the centers 14 of opposite beams 11. This arrangement forms an angular accelerometer. For the orientation in FIG. 3, the accelerometer response is:

$$\delta l = \frac{ml}{k}(\Gamma_{xz} + \omega_y - \omega_x\omega_z)$$

where m is the test mass, l is the distance between mass centers of test masses, k is the elastic constant of this mechanism, and angular rates have the same meaning as in FIG. 2.

Figure 4A:
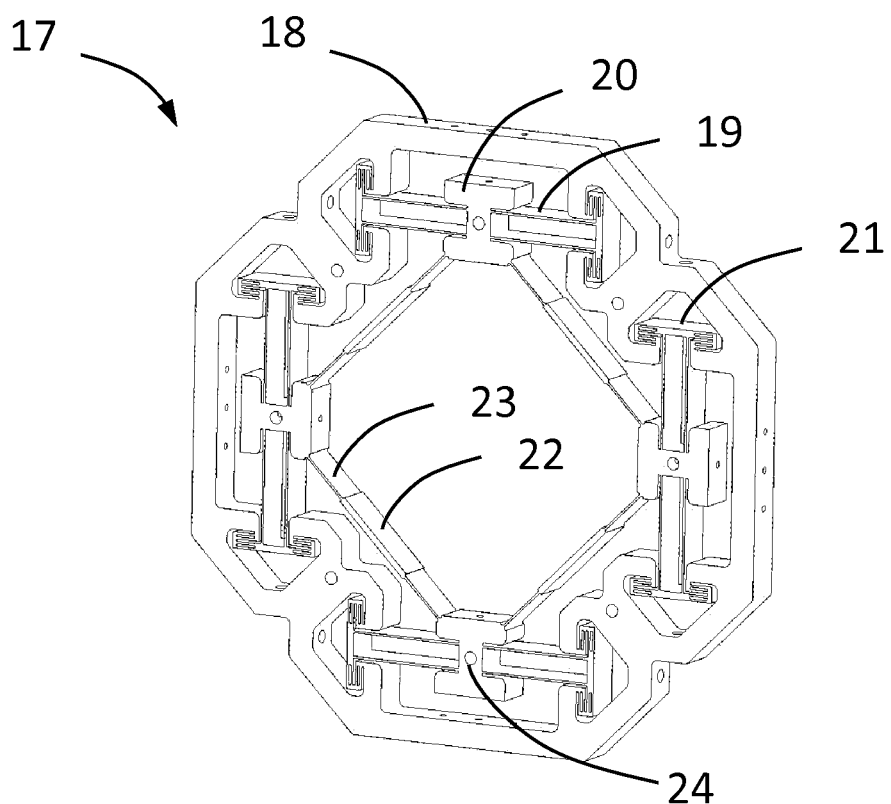
FIGS. 4A and 4B are a perspective view and a close-up view, respectively, of an exemplary embodiment of a compliant mechanism achieving the kinematic behavior of a differential accelerometer according to the present invention.
Figure 4B:
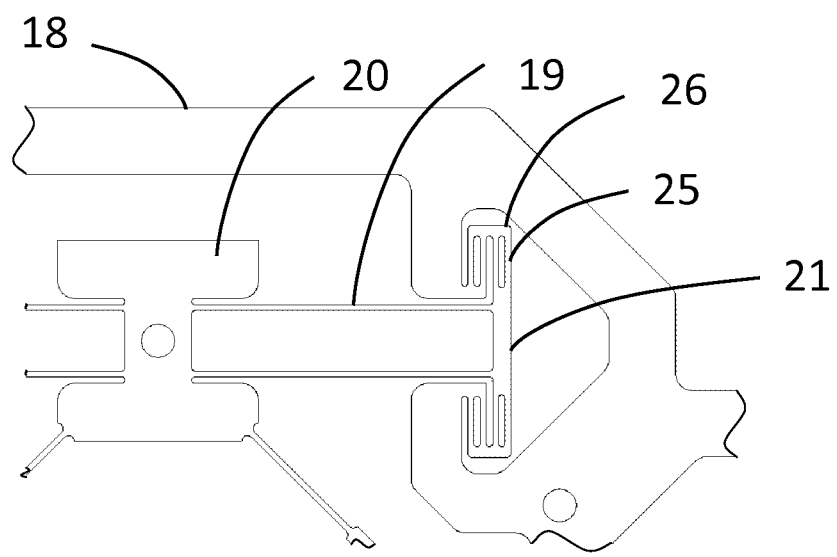

An exemplary embodiment of a mechanism achieving the function of the model in FIG. 1 is presented in FIGS. 4A and 4B. This structure is built as a compliant mechanism 17 and comprises a rigid frame 18 supporting the mechanism itself consisting of the blocks 20 connected to the beams 22 by means of the flexible sections 23 that accomplish the function of joints 12 in FIG. 1. The function of guides 13 in FIG. 1 is accomplished by the long flexures 19 having one end connected to the blocks 20 and another supported by the suspensions 21, which are double parallelogram mechanisms, allowing longitudinal movement of the flexure ends 19, while restraining their transversal displacement.

The details of suspension 21 are shown in FIG. 4B. Four flexible elements 25 on each side of the suspension are connected to a shuttle beam 26. Two of the flexible elements 25 have their other end attached to the rigid frame and the other two support the mobile base of the suspension. A number of holes 24 are provided in the node blocks and the frame for attaching various components. The mechanism can be built out of a single block using a combination of milling and electro-discharge machining. It is advantageous to make the mechanism out of a metal with a high yield strength and low elastic modulus, such as high strength aluminum. The high thermal conductivity of aluminum has the additional benefit of minimizing temperature gradients, which is important for dimensional stability. A compliant mechanism of about 0.3 m in diameter may be sufficient for a gradiometer with a sensitivity of a few Eötvös. A larger mechanism can achieve higher sensitivity, but the tradeoff is dictated by the design constraints of the application.

Figure 5:
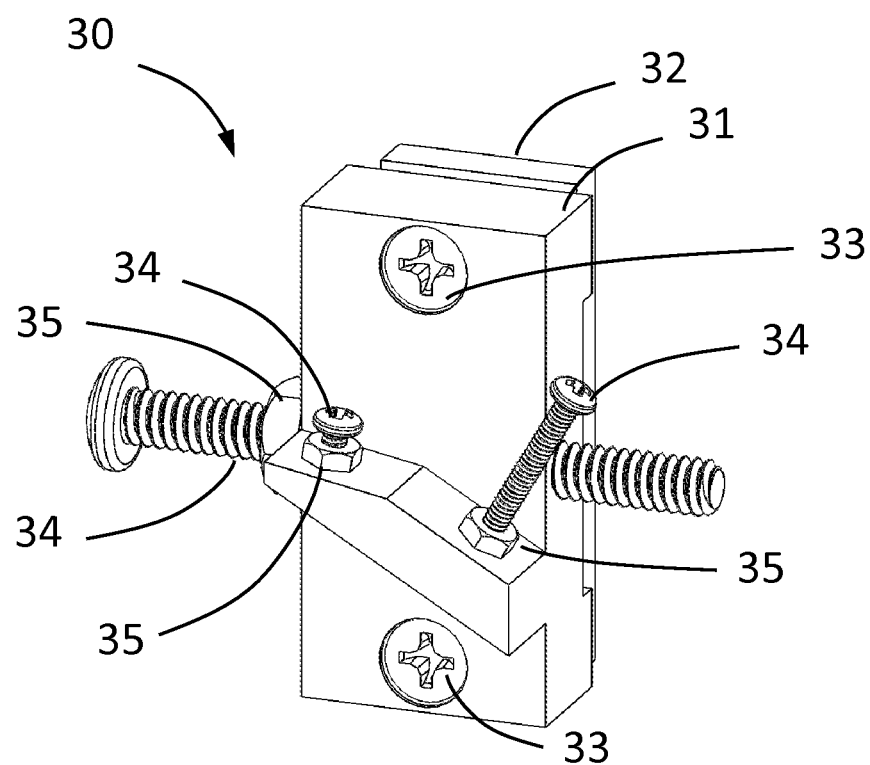
FIG. 5 is a perspective view of a balancing assembly according to the present invention.

Even though the compliant mechanism in FIGS. 4A and 4B can be built with high dimensional accuracy, there will always be small geometrical deviations and mass differences from a perfect symmetry. These have to be compensated by a means to balance the mechanism after machining. FIG. 5 shows an exemplary embodiment of a balancing assembly 30 and comprises two screws 33 that clamp a back plate 32 and a block 31 on beams 22. Block 31 carries a number of screws 34 of different sizes and orientations. Screws 34 and their locking nuts 35 are used to move the position of the center of mass of assembly 30 along the beam 22. The weight, pitch, and angle of screws 34 are selected such that they have overlapping ranges of moving the center of mass and effects ranging from coarse to very fine. By moving the center of mass of one of assemblies 30 towards one block 20, a user can compensate for that block being lighter than its opposite block.

Figure 6A:
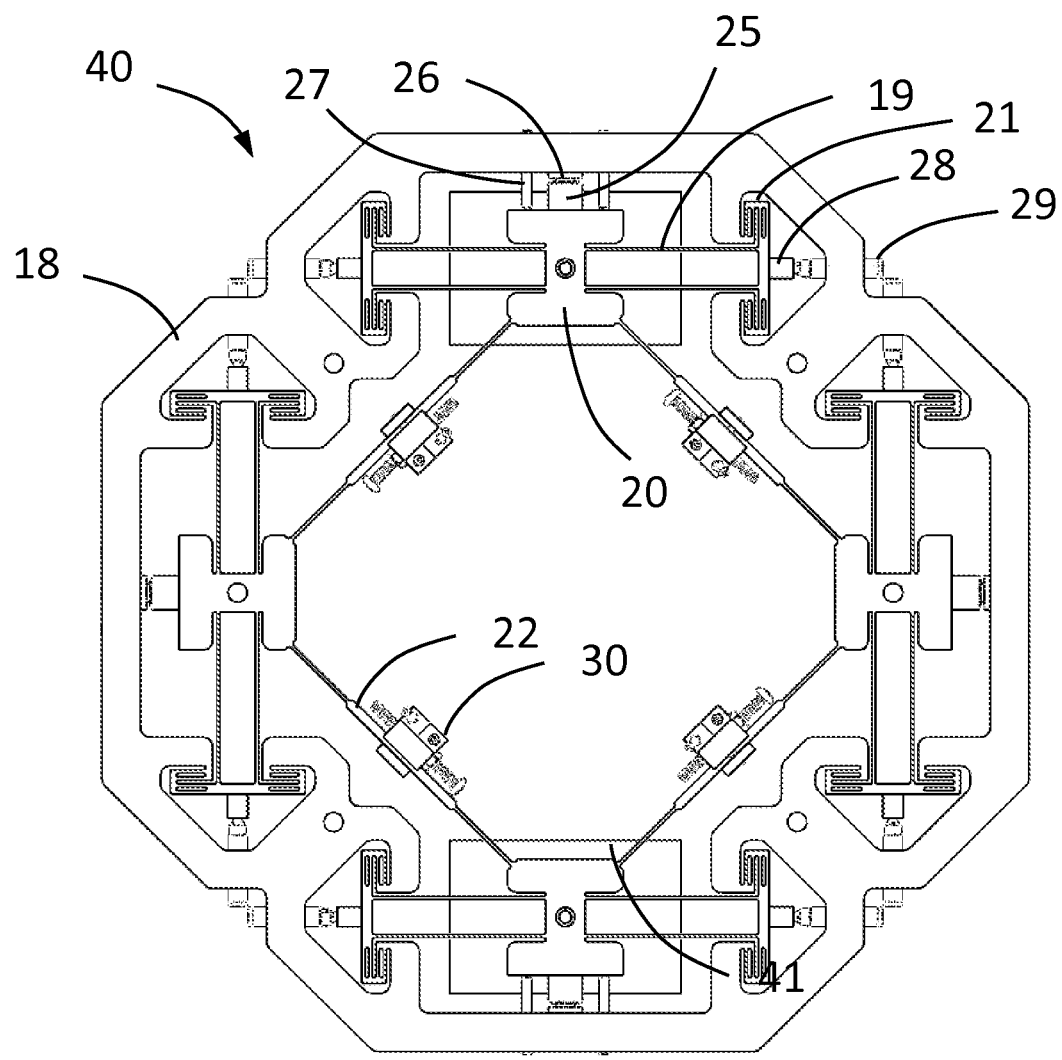
FIGS. 6A and 6B show a side view and a perspective view, respectively, of a differential accelerometer according to the present invention.
Figure 6B:
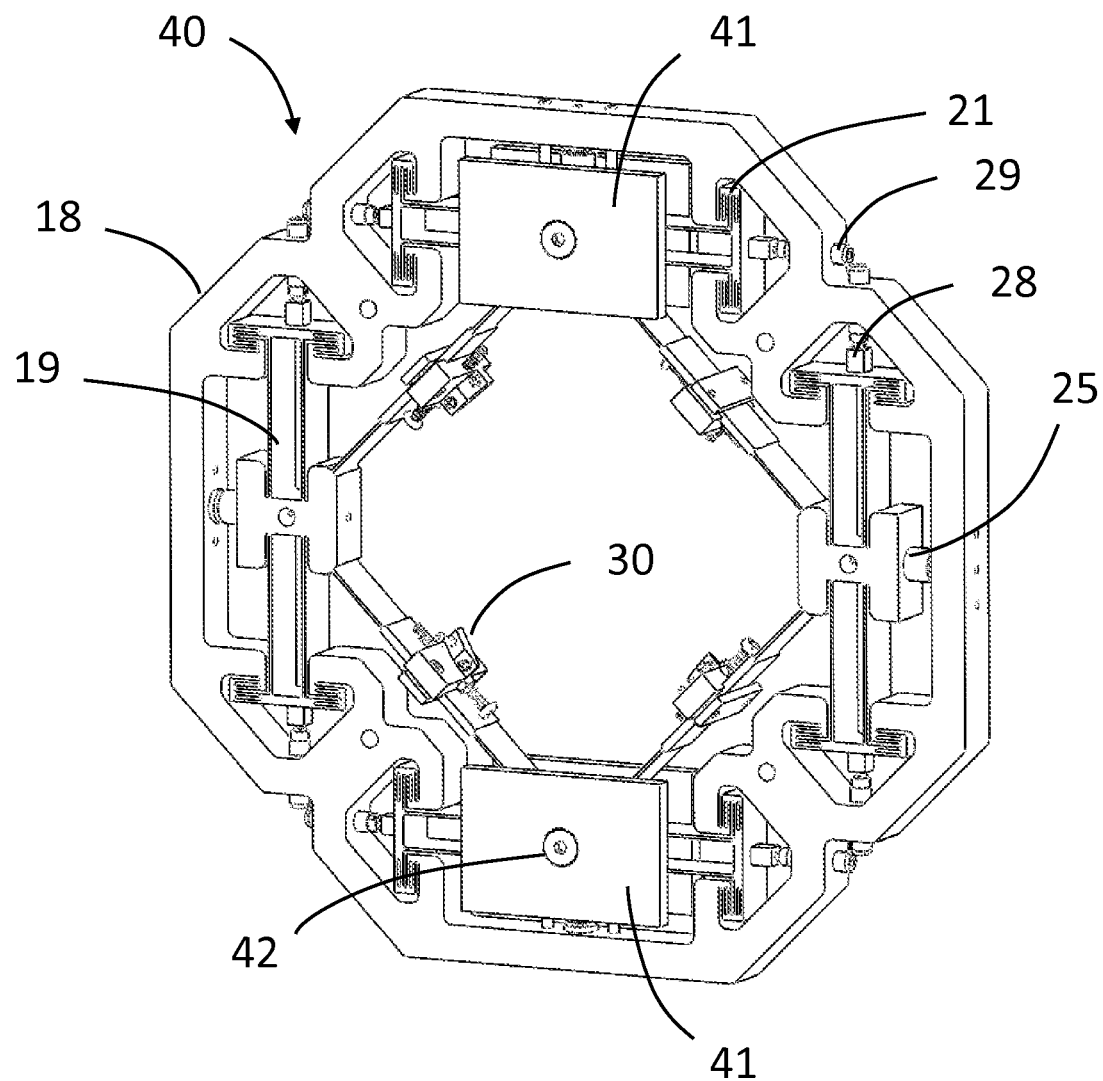

An exemplary embodiment of a differential accelerometer 40 may be seen in FIGS. 6A and 6B that shows the compliant mechanism 17 of FIG. 4A to which sensors and actuators have been added. Voice-coil actuators are mounted with the permanent magnet 25 fixed to block 20 and to coil 26 attached to frame 18. The voice-coil actuators are used to apply a force that restores the equilibrium position when an external disturbance moves the mechanism away from it, causing sensors 27 to detect a displacement. Capacitive or other kind of actuators can be used instead, provided they can apply small enough forces and have sufficient dynamic range. The displacement sensors can be capacitive, inductive (eddy current) or any other type with a sensitivity of the order of nanometers or better. Fine adjusting screws 29 are used to apply a compressive force on the flexures 19. Piezoelectric actuators 28 positioned between screws 29 and suspension 21 are used for extremely fine adjustments in the compression of flexures 19. Compressive loads on flexures 19 add a negative stiffness component to the spring constant of the mechanism by bringing the flexures close to their buckling point. This way, the sensitivity and dynamic response of the accelerometer can be adjusted and controlled. Balancing assemblies 30 clamped on the beams 22 are used to compensate the differences in the masses and geometric imperfections of the accelerometer. FIG. 6B shows top and bottom blocks 20 loaded with plates 41, preferably out of a denser metal such as brass, bolted by means of screws 42. Blocks 20, plates 41, and screws 42 together form the test masses of the differential accelerometer in FIG. 2.

Figure 7:
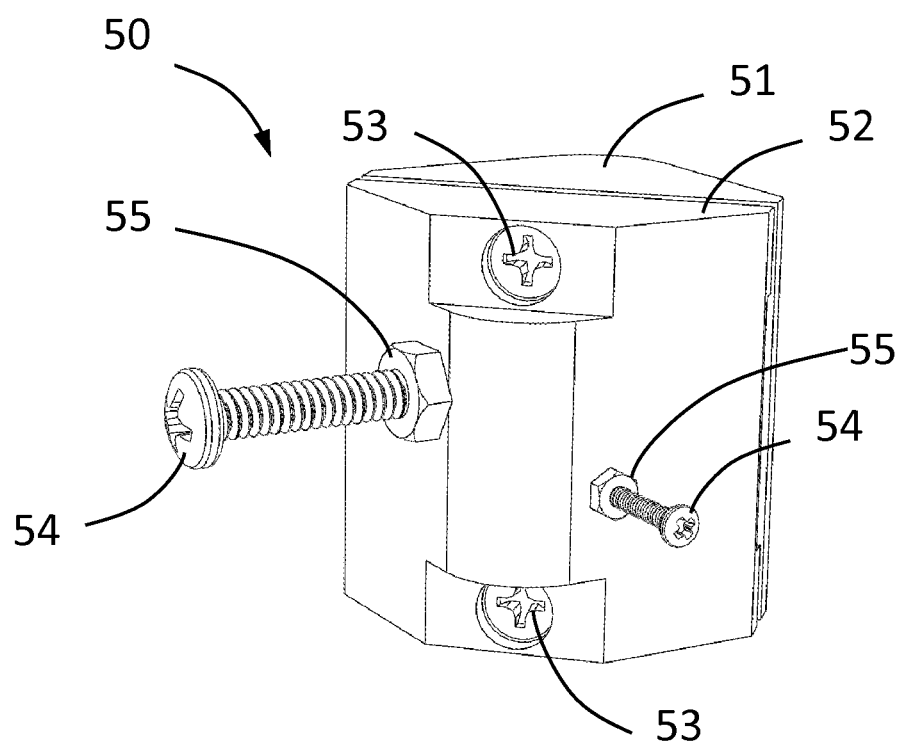
FIG. 7 is a perspective view of a test mass for an angular accelerometer according to the present invention.

For an angular accelerometer, test masses must be placed on beams 22. FIG. 7 shows an exemplary embodiment of a test mass assembly 50 for the angular accelerometer. Two screws 53 are screwed into threaded holes in back block 51 and are used to clamp block 52 on beams 22. Block 52 carries a number of screws 54 of different sizes and orientations with their locking nuts 55. Their weight, pitch, and angle are selected such that they have overlapping ranges of moving the center of mass of assembly 50. The center of mass has to be adjusted such that equal accelerations on masses 50 would produce equal torque moments.

Figure 8:
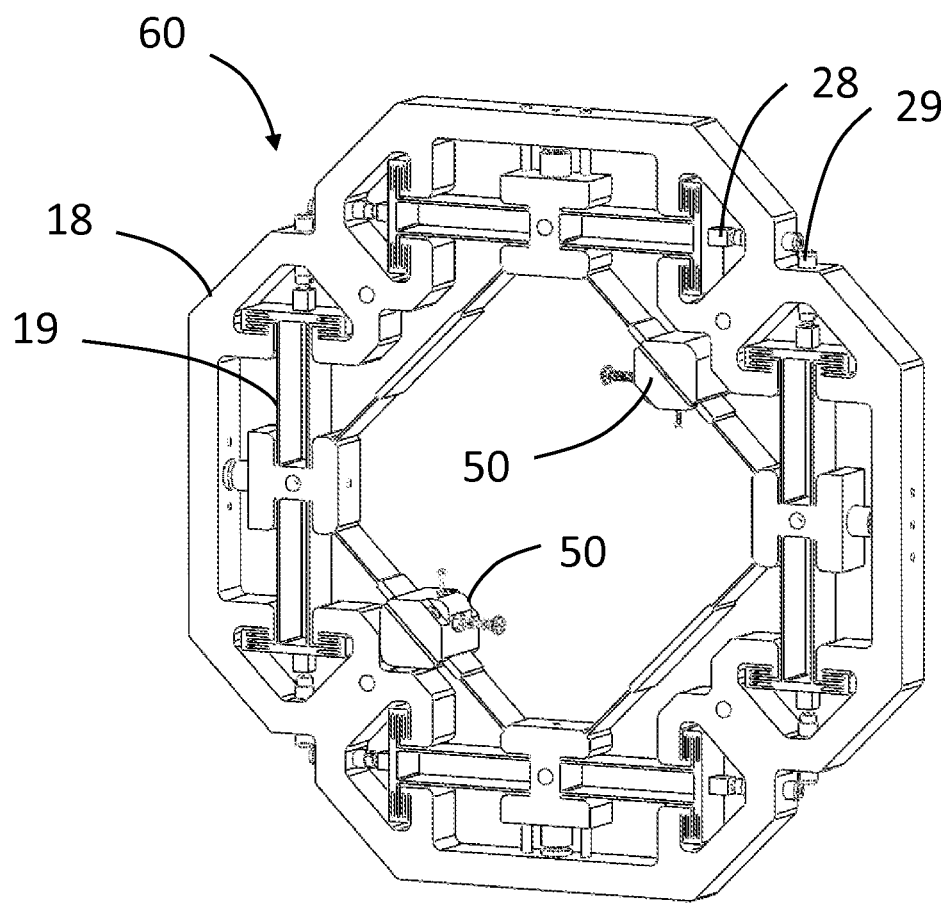
FIG. 8 is a perspective view of an angular accelerometer according to the present invention.

An exemplary embodiment of an angular accelerometer 60 may be seen in FIG. 8. Angular accelerometer 60 comprises compliant mechanism 17 of FIG. 4A to which sensors and actuators were added just as for differential accelerometer 40. Voice-coil actuators and sensors are mounted the same way as in FIG. 6A. Test mass assemblies 50 are clamped on beams 22 and screws 54 are used to compensate the differences in the masses and geometric imperfections of the accelerometer.

Figure 9:
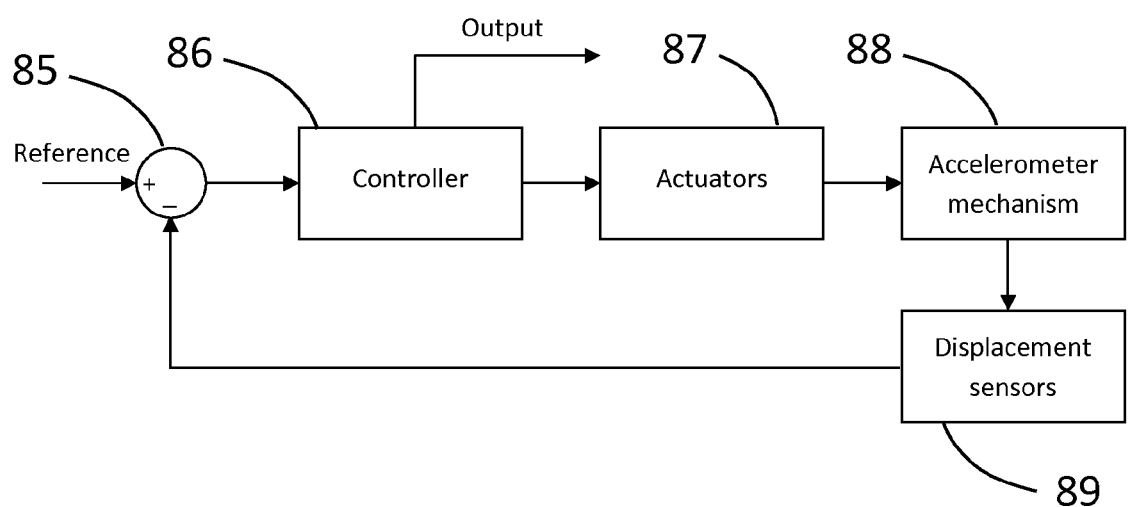
FIG. 9 is a diagram of exemplary configuration of an accelerometer subsystem according to the present invention.

Both types of accelerometers are operated in a feedback loop as exemplified in FIG. 9. A comparator 85 calculates the difference between the reference position, which is the equilibrium position, and the actual position as indicated by sensors 89 mounted on the accelerometer. A controller 86 applies to actuators 87 the excitation required to restore the equilibrium position. Actuators 87 are initially calibrated, so that from their excitation one can calculate the restoring force required to balance the force sensed by the accelerometer mechanism 88 due to the gravity gradient and rotations.

Figure 10:
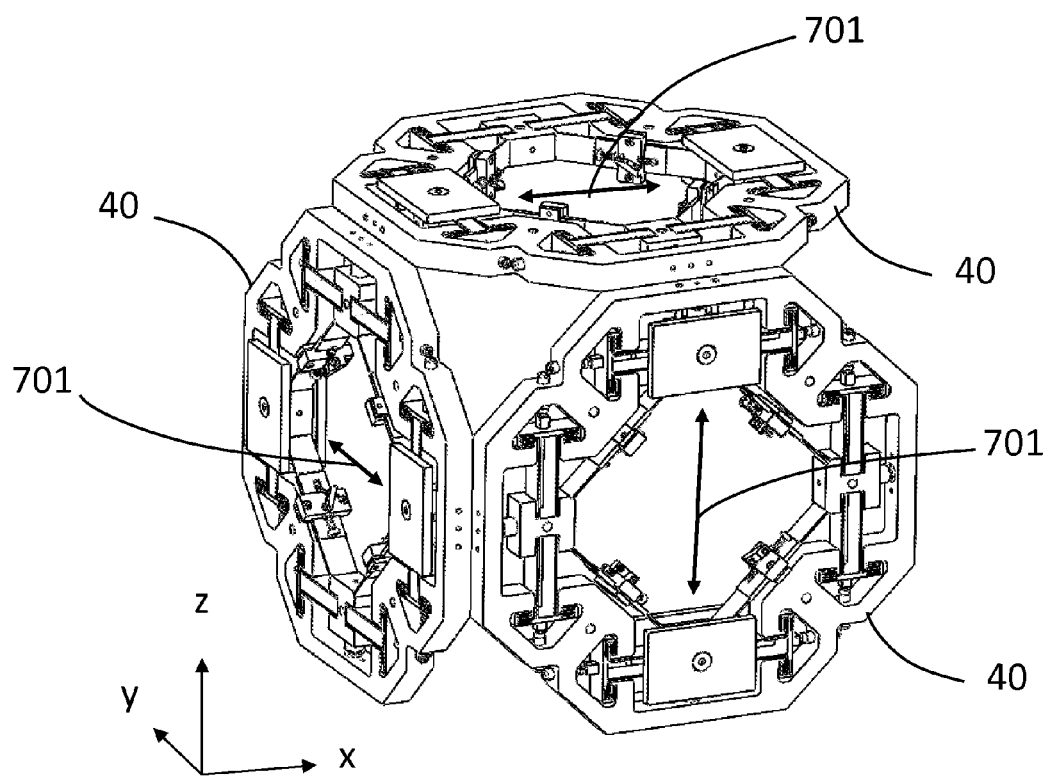
FIG. 10 is a perspective view of three differential accelerometers forming part of a gradiometer according to the present invention.

By combining three differential accelerometers, as seen in FIG. 10, one can measure the diagonal, or in-line, components of the gravity gradient tensor. If the accelerometers 40 are mounted with their sensitive axes, represented by arrows 70, along gradiometer axes x, y and z, one obtains the signals:

$$S_{xx} = \Gamma_{xx} + \omega_y^2 + \omega_z^2$$

$$S_{yy} = \Gamma_{yy} + \omega_x^2 + \omega_z^2$$

$$S_{zz} = \Gamma_{zz} + \omega_x^2 + \omega_y^2$$

where $S_{xx}$, $S_{yy}$, $S_{zz}$ are the signals coming from the accelerometers with sensitive axes oriented along axes x, y and z, respectively. We assume the signals are all scaled to be proportional to the physical quantities they represent with the same proportionality constant.

Figure 11:
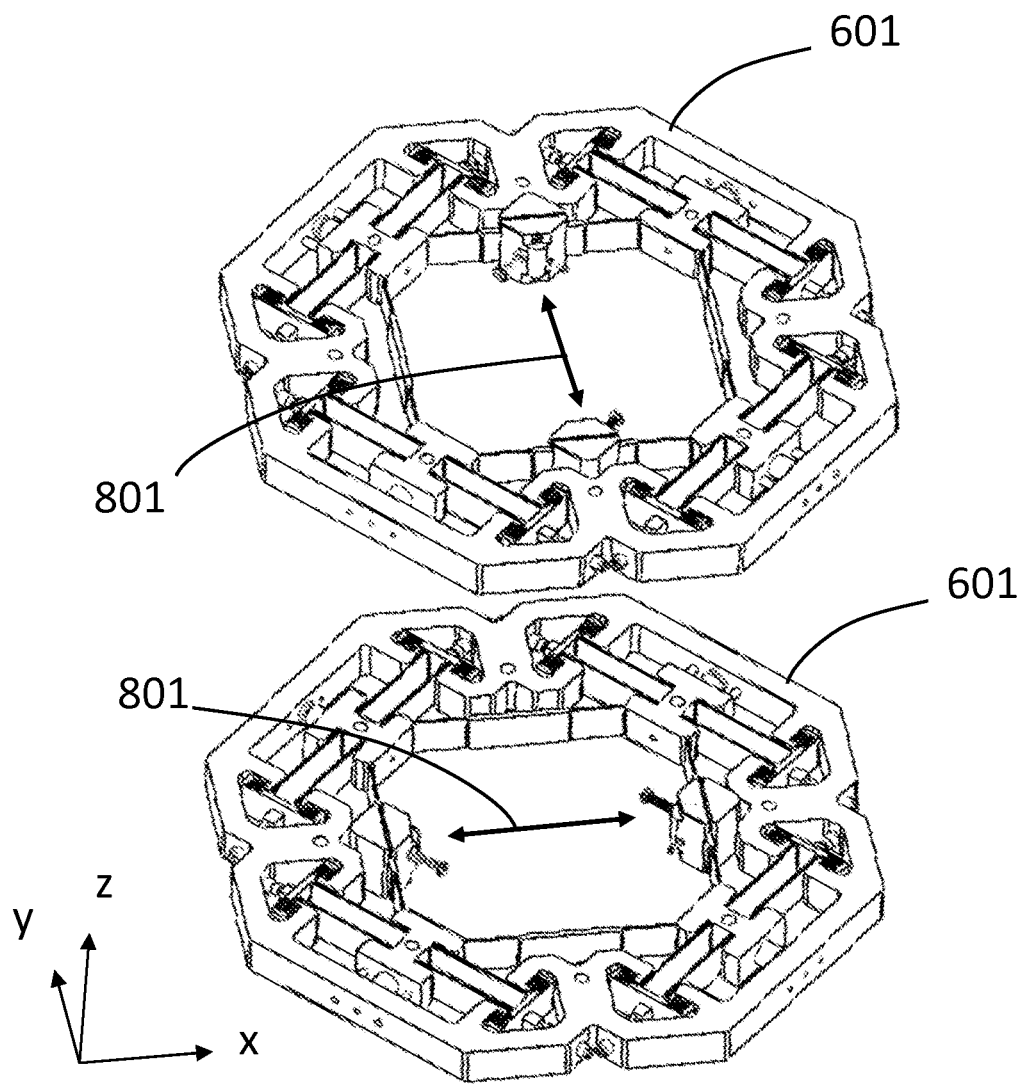
FIG. 11 is a perspective view of two angular accelerometers forming part of a gradiometer according to the present invention.

If angular rates are known the three diagonal gradient components can be calculated. To measure angular rates one can use angular accelerometers. When mounted as in FIG. 11, a pair of such accelerometers will produce the signals:

$$S_{xyz} = \Gamma_{xy} - \dot{\omega}_z - \omega_x \omega_y$$

$$S_{yxz} = \Gamma_{xy} + \dot{\omega}_z - \omega_x \omega_y$$

where $S_{xyz}$, $S_{yxz}$ are signals from the accelerometers rotating around the z axis with test masses aligned with axes x and y, respectively, and $\dot{\omega}_z$ is the angular acceleration about the z axis.

The difference of these signals yields the angular acceleration and their sum gives the signal $$S_{xyz} + S_{yxz} = 2(\Gamma_{xy} - \omega_x \omega_y)$$

Three such pairs would provide all angular accelerations and off-diagonal elements of the gradient tensor. The angular acceleration can be integrated to obtain the angular rates that can be used then to solve the equations for all tensor elements.

Figure 12:
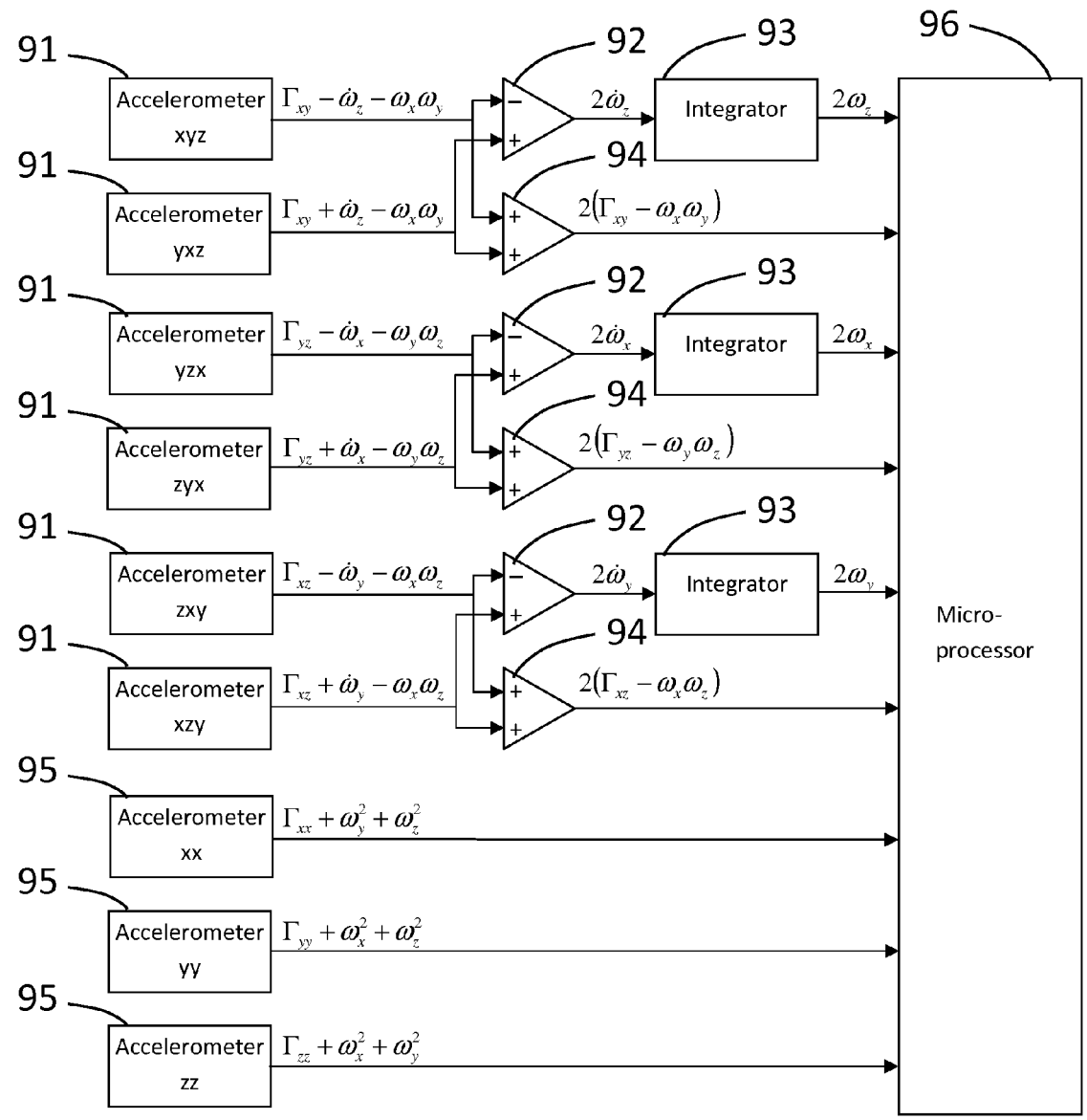
FIG. 12 is a diagram of an exemplary configuration of a full tensor gradiometer according to the present invention.

FIG. 12 illustrates an exemplary configuration of a gradiometer capable of measuring all gradient tensor components and all components of the rotation vector. Angular accelerometers 91 are grouped in pairs, each pair consisting of accelerometers in the same plane. The signals from each pair are subtracted and summed by the differential and summing amplifiers 92 and 94. The difference signal is integrated by an integrator 93 and sent to a microprocessor 96 along with the signals from the summing amplifiers 94.

The system, as illustrated in FIG. 12, is overdetermined, since there are nine signals and only eight unknown quantities. Thus, a least squares algorithm may be used to solve the equation system and allows calculating an estimate of the error. It should be recognized by those of skill in the art that one can build a gradiometer with improved sensitivity by adding more accelerometers, thereby adding more redundancy to the system.

What is claimed is:

1. A planar compliant mechanism, comprising:
   a rigid frame;
   first, second, third and fourth nodes interconnected by first, second, third, and fourth beams and forming a quadrilateral having one of said nodes at each corner and one of said beams interconnecting two of said nodes;
   first, second, third and fourth suspensions interconnected to said frame and to each of said first, second, third and fourth nodes, respectively, wherein each of said suspensions constrain each of said nodes to rectilinear movement;
   an actuator for loading at least one of said suspensions with a compressive force; and
   an adjustment screw associated with said actuator for modifying the compressive force.

2. The planar compliant mechanism of claim 1, wherein said first, second, third and fourth suspensions each comprise a double parallelogram mechanism.

3. The planar compliant mechanism of claim 2, wherein said first, second, third, and fourth beams comprise a rigid portion located between two flexible portions.

4. The planar compliant mechanism of claim 1, further comprising a displacement sensor associated with at least one of said nodes.

5. The planar compliant mechanism of claim 4, further comprising an actuator configured to apply a force to at least one of said nodes.

6. A differential accelerometer, comprising
   a rigid frame;
   first, second, third and fourth nodes interconnected by first, second, third, and fourth beams and forming a quadrilateral having one of said nodes at each corner and one of said beams interconnecting two of said nodes;
   first, second, third and fourth suspensions interconnected to said frame and to each of said first, second, third and fourth nodes, respectively, wherein each of said suspensions constrain each of said nodes to rectilinear movement;
   two equal test masses interconnected to an opposing pair of said first, second, third and fourth nodes; and
   four balancing blocks, each having a plurality of adjustment screws of various sizes and placed at different orientations and each being attached to one of said beams 7. The differential accelerometer of claim 6, further comprising an electronics package that is programmed to implement a control loop with negative feedback for maintaining the equilibrium position of said accelerometer.

8. An angular accelerometer, comprising
a rigid frame;
first, second, third and fourth nodes interconnected by first, second, third, and fourth beams and forming a quadrilateral having one of said node at each corner and one of said beams interconnecting any two of said nodes;
first, second, third and fourth suspensions interconnected to said frame and to each of said first, second, third and fourth nodes, respectively, wherein each of said suspensions constrain each of said nodes to rectilinear movement; and
two equal test masses interconnected to a midpoint of each of an opposing pair of said first, second, third, and fourth beams, wherein said two equal test masses include a plurality of adjustment screws of various size and placed at different orientations.

9. The angular accelerometer of claim 8, further comprising an electronics package programmed to implement a control loop with negative feedback for maintaining the equilibrium position of said accelerometer.

10. A gravity gradiometer comprising:
a plurality of differential accelerometers, each of which comprises
 a first rigid frame,
 first, second, third and fourth nodes interconnected by first, second, third, and fourth beams and forming a quadrilateral having one of said node at each corner and one of said beams interconnecting two of said nodes,
 first, second, third and fourth suspensions interconnected to said first frame and to each of said first, second, third and fourth nodes, respectively, wherein each of said suspensions constrain each of said nodes to rectilinear movement, and
 two equal test masses interconnected to an opposing pair of said first, second, third and fourth nodes;
a plurality of angular accelerometers, each of which comprises
 a second rigid frame,
 fifth, sixth, seventh, and eight nodes interconnected by fifth, sixth, seventh, and eight beams and forming a quadrilateral having one of said nodes at each corner and one of said beams interconnecting two of said nodes,
 fifth, sixth, seventh, and eight suspensions interconnected to said frame and to each of said fifth, sixth, seventh, and eight nodes, respectively, wherein each of said suspensions constrain each of said nodes to rectilinear movement,
 and two equal test masses interconnected to a midpoint of each of an opposing pair of said fifth, sixth, seventh, and eight beams;
an electronic package programmed to calculate a gradient tensor based on angular accelerations and acquiring off-diagonal elements by obtaining the calculated gradient sensor; and three pairs of said angular accelerometers and three pairs of said differential accelerometers.

11. The gravity gradiometer of claim 10, wherein each of said three differential accelerometers is positioned at right angles to each other of said differential accelerometers.

12. The gravity gradiometer of claim 11, wherein each of said three pairs of said angular accelerometers comprise first and second angular accelerometers, each of which extends along a plane that is parallel to and spaced apart from the plane of the other accelerometer.

13. The gravity gradiometer of claim 11, wherein each of said three pairs of said angular accelerometers are positioned at right angles to each other pair.

* * * * *